United States Patent [19]
Johnston

[11] Patent Number: 4,860,149
[45] Date of Patent: Aug. 22, 1989

[54] ELECTRONIC PRECIPITATOR CONTROL

[75] Inventor: David F. Johnston, Hampton, Va.

[73] Assignee: The United States of America as represented by the United States National Aeronautics and Space Administration, Washington, D.C.

[21] Appl. No.: 862,942

[22] Filed: May 14, 1986

Related U.S. Application Data

[62] Division of Ser. No. 625,436, Jun. 28, 1984, Pat. No. 4,605,424.

[51] Int. Cl.[4] .......... H02H 3/26
[52] U.S. Cl. .......... 361/79; 361/65; 323/903; 55/105; 55/139
[58] Field of Search .......... 361/30, 65, 79, 235; 55/105, 139; 323/903

[56] References Cited

U.S. PATENT DOCUMENTS

| | | | |
|---|---|---|---|
| 3,048,744 | 8/1962 | Warrington | 361/65 |
| 3,622,839 | 11/1971 | Abrams | 361/235 |
| 4,251,846 | 2/1981 | Pearson et al. | 361/30 |
| 4,479,164 | 10/1984 | Siegel | 361/235 |
| 4,486,704 | 12/1984 | Gustafsson et al. | 55/105 X |

*Primary Examiner*—A. D. Pellinen
*Assistant Examiner*—Derek S. Jennings
*Attorney, Agent, or Firm*—George F. Helfrich; Harold W. Adams; John R. Manning

[57] ABSTRACT

A method and apparatus for controlling power to a preciptator 27. After each spark the power to the precipitator is reduced to zero, increased along a fast ramp 15 for a fixed period of time and then increased along a slow ramp 17 until a spark occurs. The fast and slow ramp data is computed and stored (memory 48) and then retrieved after each spark. The data retrieved is the data corresponding to the firing angle at the last spark. Apparatus is provided (selector 51 and memory 52) for dividing (frequency divider 45) the retrieved slow ramp data by a number to select the number of sparks per minute. Also the AC current and the AC voltage in the power to the precipitator are detected and the RMS values are obtained (32 and 34) and compared 35 and if the difference is above a predetermined value the power is disconnected (relay 36 and contacts 23 and 24).

3 Claims, 4 Drawing Sheets

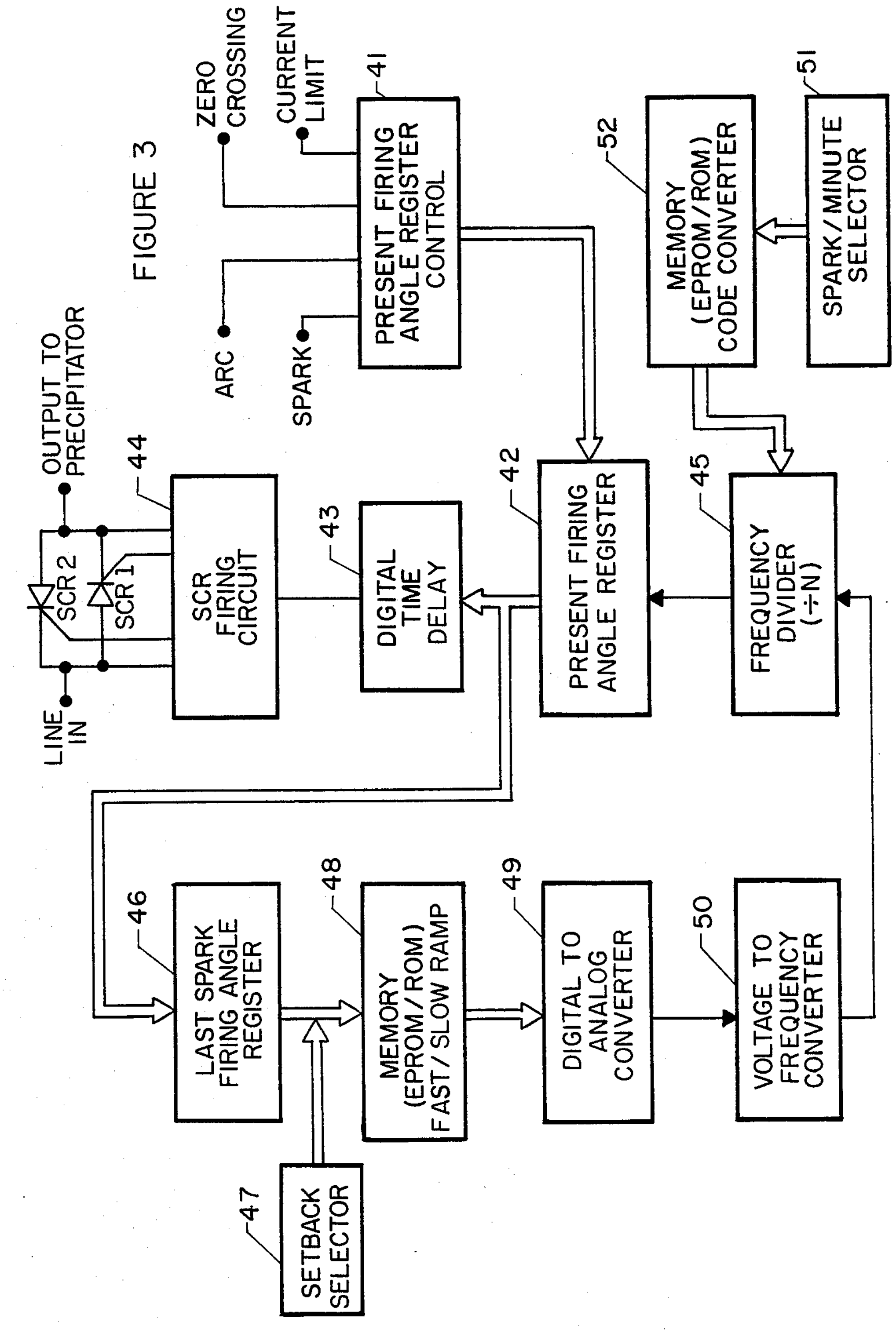
FIGURE 3
ZERO CROSSING
CURRENT LIMIT
ARC
SPARK
41
PRESENT FIRING ANGLE REGISTER CONTROL
52
MEMORY (EPROM/ROM) CODE CONVERTER
51
SPARK/MINUTE SELECTOR
OUTPUT TO PRECIPITATOR
44
SCR 2
SCR 1
SCR FIRING CIRCUIT
LINE IN
43
DIGITAL TIME DELAY
42
PRESENT FIRING ANGLE REGISTER
45
FREQUENCY DIVIDER (÷N)
46
LAST SPARK FIRING ANGLE REGISTER
48
MEMORY (EPROM/ROM) FAST/SLOW RAMP
49
DIGITAL TO ANALOG CONVERTER
50
VOLTAGE TO FREQUENCY CONVERTER
47
SETBACK SELECTOR

ELECTRONIC PRECIPITATOR CONTROL

ORIGIN OF THE INVENTION

The invention described herein was made by an employee of the U.S. Government and may be manufactured and used by the Government for governmental purposes without the payment of any royalties thereon or therefor.

This is a division of application Ser. No. 625,436, filed June 28, 1984.

BACKGROUND OF THE INVENTION

The invention relates generally to electrostatic precipitators and more specifically concerns the control of electrostatic precipitators.

An electrostatic precipitator removes the particulate matter from the smoke created by the burning of a fuel. The smoke is exposed to an electrostatic field, and the particles become electrically charged and migrate to the charged collecting surfaces creating the field. To maximize the collection of particulate, a precipitator should be operated at the highest practical field potential, the effect being to increase both the particle charge and the electrostatic collection field; however, the maximum field potential at which the precipitator can operate is limited by sparking and arcing which, if not controlled, can damage the precipitator and control system.

When the same type of fuel is burned continuously and the combustion is held relatively constant, the smoke is of a constant composition, and the magnitude of the electrostatic field for maximum particulate collection can be fairly constant. However, when a varying fuel such as refuse is burned or there are changes in the combustion, the composition of the smoke changes requiring corresponding changes in the magnitude of the electrostatic field. The point of maximum particulate collection cannot be held constant; therefore, an electronic control that can adjust rapidly to varying fuel and combustion is necessary to maintain precipitator efficiency.

It is therefore the primary object of this invention to provide an electronic control for electrostatic precipitators that can adjust rapidly and efficiently to varying fuel and combustion.

In the past a few of the electronic controls for electrostatic precipitators have reduced the power to the precipitators whenever a spark occurs and then increased the power along a fast ramp and then along a slow ramp until another spark occurs at which time the power is again reduced and the process repeated. These prior art controls apparently work well when the fuel and combustion are not varying. That is, these prior controls work well when the spark line remains constant or varies very little. However, whenever the spark line varies substantially, as a result of burning a varying fuel, these prior art controls are not efficient since their fast and slow ramp power curves do not provide a good fit to the spark line.

Hence, another object of this invention is to provide an electronic control for electrostatic precipitators in which after a spark power is reduced and then increased along fast and slow ramps that provide an efficient fit to the spark line even when the spark line is varying substantially.

A further object of this invention is to provide an electronic control for electrostatic precipitators in which after a spark power is reduced and then increased along fast and slow ramps whose slopes are dependent on the power at the time of the spark.

Still another object of this invention is to provide an electronic control for electrostatic precipitators which simply and efficiently detects open or short circuits in the power circuit to the precipitators.

A still further object of this invention is to provide an electronic control for electrostatic precipitators in which the number of sparks per minutes can be selected.

Yet another object of this invention is to provide an electronic control for electrostatic precipitators in which the power curve can be varied to more nearly fit the spark line.

Other objects and advantages of this invention will become apparent hereinafter in the specification and drawings.

SUMMARY OF THE INVENTION

The invention relates essentially to a control for electrostatic precipitators that can adjust efficiently to varying fuel and combustion. Whenever a spark occurs the power is cut off to the precipitator for a short period, then the power is increased along a fast ramp to a setback percentage of the power applied to the precipitator when the spark occurred. The power is then increased along a slow ramp until the next spark occurs. The fast ramp travels the distance from the firing angle of 180° to the firing angle at setback and the slow ramp travels the distance from the firing angle at setback to the firing angle at spark. These distances for the fast and slow ramps are stored in pairs in a permanent storage and the appropriate pair is selected after each spark. Means are provided for changing the distance of the slow ramp after selection so that any number of sparks per minute and can selected. Means are also provided for detecting both open and short circuits and removing the power from the precipitator when either occurs.

BRIEF DESCRIPTION OF THE DRAWINGS

FIG. 3 is a block diagram of a hardware version of the SCR control circuit in FIG. 2.

DETAILED DESCRIPTION OF THE INVENTION

Figure 1:
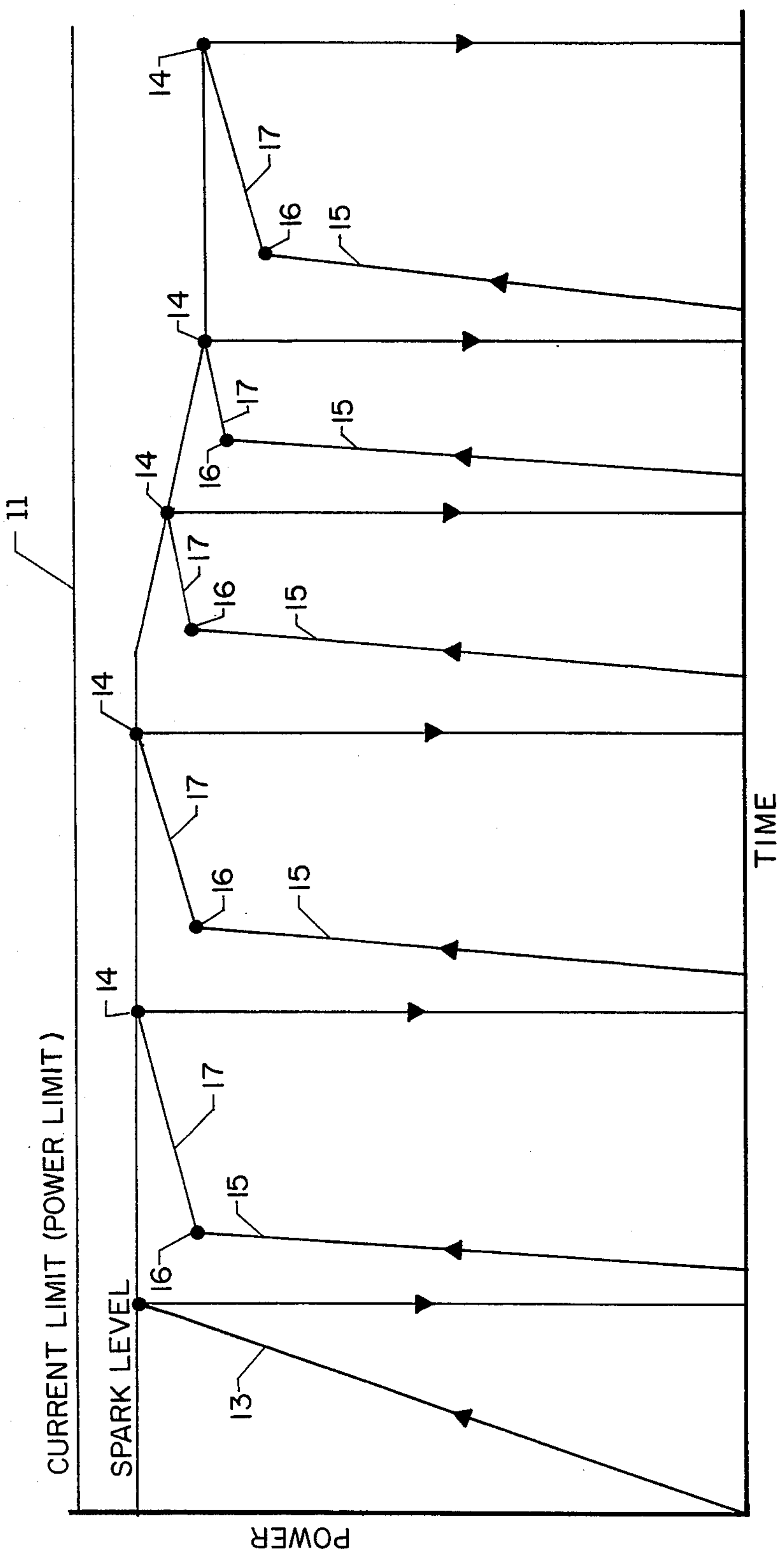
FIG. 1 is a graph of power versus time of power applied to a precipitator for the purpose of describing the operation of the invention.
Figure 2:
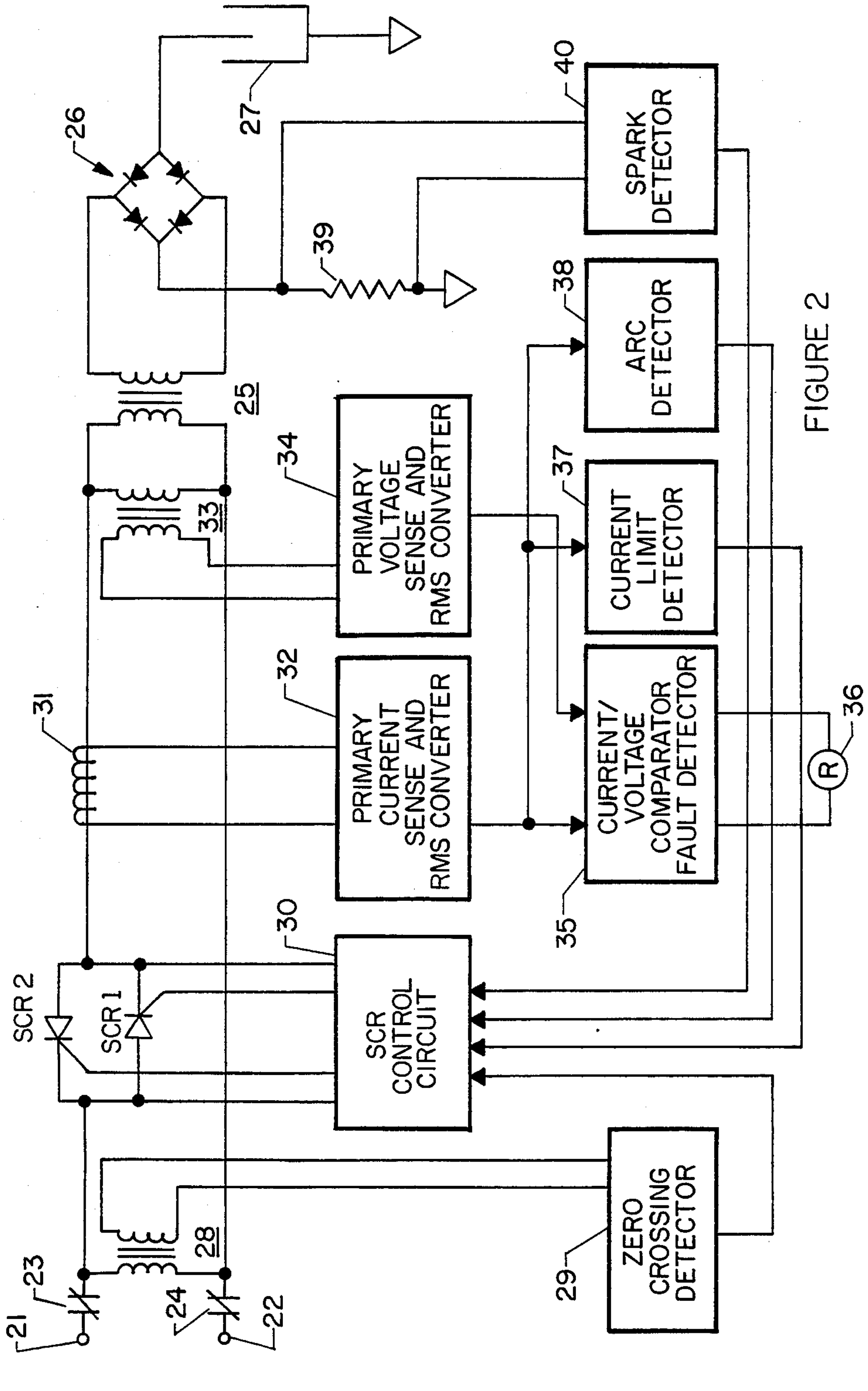
FIG. 2 is a block diagram of the invention.

The control of the power to a precipitator by this invention after sparks occur can best be understood by referring to FIG. 1. FIG. 1 is a graph of power versus time of the power applied to a precipitator as taught by this invention. The plot 11 is the current limit of the precipitator. Whenever the power exceeds the current limit there is a possibility of damage to the precipitator. The plot 12 is the spark level, that is, whenever power is applied to the precipitator at this spark level the precipitator will spark. When power is initially applied to a precipitator, it is increased along a ramp 13 until a spark occurs at a point 14 on the spark level 12. The power is then immediately reduced to zero where it remains at zero for a short period of time, for example 50 msec, to allow the spark to extinguish. At this time, the power is increased along a fast ramp 15 to a setback point 16; and then increased along a slow ramp 17 until the precipitator sparks. The projection of fast ramp 15 along the time axis is a short interval of time, for example, one-eighth of a second which is the same for all fast ramps. The projection of the fast ramp 15 along the power axis is the relative setback power $P_{SB}$ and is calculated with the following equation:

$$P_{SB}=P_f/2\ (1+\cos\theta)\ K \quad (1)$$

where the part of the equation in brackets is the power to the precipitator when a spark occurs, $P_f$ is full power, $\theta$ is the firing angle at spark of the SCRs (silicon controlled rectifiers) that control the power to the precipitator and K is a constant less than one or a percentage, which is selected by the operator. The selector of K depends on the type of fuel being burned: If the fuel is a varying fuel such as refuse then the selected K should be relatively low or if the fuel is a constant fuel (constant spark line) then the selected K should be relatively high.

Turning now to the embodiment of the invention selected for illustration in the drawings, the numbers 21 and 22 designate input terminals to which power is applied. Input terminal 21 is connected through a normally closed relay contact 23 and inverse parallel SCR1 and SCR2 to one side of the primary of a step up transformer 25 and input terminal 22 is connected through a normally closed relay contact 24 to the other side of the primary of transformer 25. The secondary of transformer 25 is connected across a full wave rectifier 26 which supplies current or power to a precipitator 27.

The primary of a transformer 28 is connected across the power input and the secondary of the transformer is connected to a zero crossing detector 29. The voltage of the input power is in the form of a sine wave. Hence, the zero crossing detector 29 produces two timing signals, during each cycle of the input voltage, that are applied to a SCR control circuit 30. A current transformer 31 senses the input current and applies it to a primary current sense and RMS (root means square) converter 32. The primary of a transformer 33 is connected across the power input and the secondary of the transformer is connected to a primary voltage sense and RMS converter 34. The outputs of converters 32 and 34 are applied to a current/voltage comparator fault detector 35. Detector 35 compares the outputs from converters 32 and 34, and if they differ by more than some predetermined value, a relay 36 is actuated thereby opening normally closed relay contacts 23 and 24. If a short circuit exists the current is rising much faster than the voltage or if an open circuit exists the voltage is rising much faster than the current. In either case the difference in the outputs of converters 32 and 34 is large enough to cause detector 35 to actuate relay 36 and thereby disconnect to power input. As long as there is no short or open circuit relay 36 will not be actuated and power will remain connected to the precipitator. The output of converter 32 is also applied to a current limit detector 37 and an arc detector 38. Current limit detector 37 applies a signal to SCR control circuit 30 whenever the current limit as shown in FIG. 1 is exceeded and arc detector 38 applies a signal to SCR control circuit 30 whenever an arc occurs in the precipitator 27. The current from rectifier 26 in addition to being applied to precipitator 27 is passed through a resistor 39 to ground. Whenever a spark occurs in precipitator 27 there is a momentary increase in current from rectifier 26. This produces an increase in voltage across resistor 39 which is detected by a spark detector 40 and then applied to the SCR control circuit 30.

A first embodiment of the SCR control circuit 30 is shown in FIG. 3. The outputs from the zero crossing detector 29, the current limit detector 37, the arc detector 38 and the spark detector 40 are applied to a present firing angle register control 41. The zero crossing signals are for timing and the other three signals applied to control 41 are for controlling a present firing angle register 42. The number store in the present firing angle register 42 is applied through a digital time delay 43 to a SCR firing circuit 44 which controls the firing of SCR1 and SCR2.

Power is applied to the precipitator in terms of SCR firing angle degrees. The electrical cycle which is a sine wave is 360°. The sine wave contains a positive half cycle and a negative half cycle with respect to polarity, therefore, each SCR can be fired anywhere from 0° to 180° in the electrical cycle, 0° being full power and 180° being zero power. Note that if a SCR is fired (gated on) at 60°, it would conduct from 60° to 180°. Hence, a difference in a firing angle and some other angle, for example 180°, can be represented as a distance along the abscissa of the sine wave. The SCR stops conducting at 180° because of the polarity reversal of the electrical cycle.

The firing angle output from angle register 42 is continuously changing. The electrical half cycle from 0° to 180° is broken into a number of distinct SCR firing angles. The number of possible firing angles is dictated by the resolution desired. The rate of change of the output from angle register 42 is determined by the input from a frequency divider 45. Whenever a spark occurs present firing angle register control 41 receives a signal and in response thereto tells the angle register 42 to transfer its present output to a last spark firing angle register 46. A setback selector 47 selects the setback constant K as defined in equation (1). A memory (EPROM/ROM) fast/slow ramp 48 stores the distance values for producing the fast ramps 15 and slow ramps 17 in FIG. 1.

In determining the distance values for the fast and slow ramps the following equation (2) is used:

$$P=P_f/2\ (1+\cos\theta) \quad (2)$$

First, a firing angle $\theta_S$ at spark is assumed and P is computed. Then the computer P is multiplied by K to obtain $P_{SB}$. This value of $P_{SB}$ is then used in equation (2) to compute $\theta_{SB}$. After $\theta_{SB}$ is determined the fast ramp distance is determined by subtracting $\theta_{SB}$ from 180° and the slow ramp distance is determined by subtracting $\theta_{SB}$ from $\theta_S$. This process is repeated for all possible firing angles $\theta_S$ at spark. Note that only the first 180° or positive half of the power cycle has been discussed but it is obvious that these values of the fast and slow ramps will also apply to the negative half of the power cycle (180° to 360°). The pre-calculated values of distances representative of the fast and slow ramps are stored in pairs in memory 48. Each combination of K from setback selector 47 and $\theta_S$ from register 46 selects a pair of distance values from memory 48 representing the fast and slow ramps. The fast ramp value is applied first to a digital-to-analog converter 49 then the slow ramp value is applied to converter 49. The analog voltages from converter 49 are converted to frequencies by a voltage to frequency converter 50. The fast ramp and slow ramp frequencies from converter 50 are applied to frequency divider 45 where the fast ramp frequency is divided by one and the slow ramp frequency is divided by a number supplied from a memory (EPROM/ROM) code converter 52. Frequency divider 45 has a timer included with it which operates to cause divider 45 to divide by one for a fixed period of time (⅛ sec) after the fast ramp frequency begins and then divide by the number provided by code converter 52. To synchronize the frequency divider timer with the fast ramp frequency at the output of converter 50 it is necessary that the fast ramp frequency last for the fixed period of time (⅛ sec) of the timer. A spark/minute selector 51 which is a thumbwheel switch calibrated in sparks per minute selects a number from memory 52 that will provide the desired number of sparks per minute when the slow ramp frequency is divided by the number from memory 52. The fast ramp frequency at the output of divider 45 is applied to present firing angle register 42 which in response thereto decreases the SCR firing angle from 180° to $\theta_{SB}$. Then the slow ramp frequency at the output of divider 45 is applied to the present firing angle register 42 which in response thereto further decreases the SCR firing angle from $\theta_{SB}$ to $\theta_S$.

Whenever an arc occurs or at start up there is not a number in last spark firing angle register 46. Hence, in response thereto a number that produces the ramp 13 in FIG. 1 is selected from memory 48. Whenever a current limit signal is received by the present firing angle register control 41 a signal is applied to present firing angle register 42 which stops the slow ramp from rising.

In the operation of the embodiment of the invention disclosed in FIG. 3 all fast and slow ramp distance values are calculated and stored in memory 48. Then with the power connected to the precipitator 27 the number at the output of present firing angle register 42 is continuously changing to thereby increase the power to the precipitator. This continues until there is a spark at which time present firing angle register control 41 receives a signal indicating that there has been a spark. In response thereto control of 41 resets register 42 and the number in register 42 before reset is transferred to last spark firing angle register 46. The number in register 46 and the number in setback selector 47 chosen by the operator select a fast and slow ramp distance value pair from memory 48. These distance values are changed to analog by converter 49 and then to frequencies by converter 50. The fast ramp frequency which is applied to frequency divider 45 first has a set duration (⅛ sec) and is divided by one by divider 45. This frequency when applied to present firing angle register 42 increase the power to the precipitator from zero to the selected setback in the set duration. After the set duration the slow ramp frequency is applied to frequency divider 45 where the frequency is divided by a number N. N is a number which will produce the desired number of sparks per minute as selected by selector 51. The resulting frequency when applied to angle register 42 increases the power to the precipitator from the selected setback until the precipitator sparks.

Figure 4:
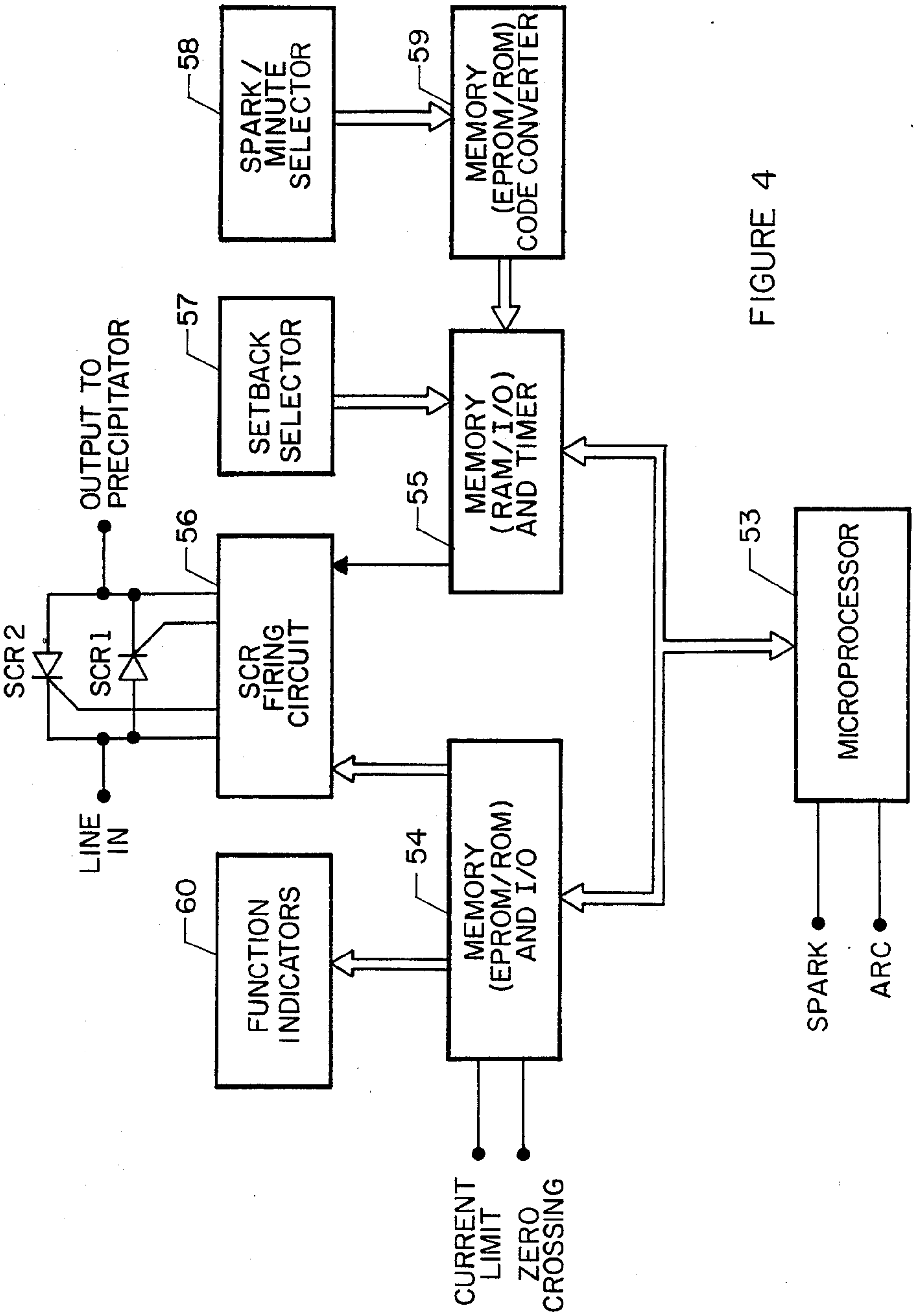
FIG. 4 is a block diagram of a software version of the SCR control circuit in FIG. 2.

A computer type second embodiment of the SCR control circuit 30 is shown in FIG. 4. In this embodiment an SCR firing circuit 56, a setback selector 57, a spark/minute selector 58 and a memory (EPROM/ROM) code converter 59 are like their counterparts 44, 47, 51 and 52 in FIG. 3. A microprocessor 53 with memory (EPROM/ROM) and I/O 54 and memory (RAM)/I/O and timer 55 are programmed to provide the functions of the hardware disclosed in FIG. 3. Memory 54 is for permanent storage for values of fast ramp 15, slow ramp 17, and initial ramp 13. Memory 55 is for temporary storage for present firing angles and last spark firing angles. A function indicator 60 is for the purpose of visually displaying the different functions performed.

All of the structure disclosed in the blocks in the drawings of this application is either commercially available or would be obvious to one having ordinary skill, hence the details of this structure has not been described.

The advantages of this invention over prior art precipitator controls is that it maintains the precipitator at the level of maximum particulate collection and at the same time protects the precipitator from undue sparking, it is efficient when the precipitator is used in refuse burning facilities or when any variable combustion fuel is used, it has the capability of selecting the number of sparks per minute that will result when the precipitator is operational and it provides a simple straight forward means for detecting short and open circuits and disconnecting the power from the precipitator whenever either occurs.

The embodiment of the invention disclosed is a preferred embodiment and various changes can be made without departing from the invention. For example, different apparatus from that disclosed could be used to perform the different disclosed functions.

What is claimed is:

1. A method for controlling the power to a load comprising the steps of:
   - detecting the AC current in said power;
   - deriving the RMS value of the detected AC current;
   - detecting the AC voltage in said power;
   - deriving the RMS value of the detected AC voltage;
   - comparing directly the said RMS values of the current and voltage; and
   - whenever the difference between the RMS values of the current and voltage exceeds a predetermined value disconnecting the power from the load.

2. Apparatus for controlling power in the power circuit to a load comprising:
   - means for detecting the AC current in the power circuit to the load;
   - means for obtaining the RMS value of the detected AC current;
   - means for detecting the AC voltage in the power circuit to the load;
   - means for obtaining the RMS value of the detected AC voltage; and
   - means for comparing directly the said RMS values of the current and voltage whereby whenever the difference between the RMS values of the current and voltage exceeds a predetermined value there is either an open or short circuit in the power circuit.

3. Apparatus according to claim 2 including means responsive to the output of said comparing means for disconnecting the power circuit to the load whenever the output exceeds said predetermined value.

* * * * *

UNITED STATES PATENT AND TRADEMARK OFFICE

CERTIFICATE OF CORRECTION

PATENT NO. : 4,860,149

DATED : Aug. 22, 1989

INVENTOR(S) : David F. Johnston

It is certified that error appears in the above-identified patent and that said Letters Patent is hereby corrected as shown below:

On the title page, item "[73] Assignee: The United States of America as represented by the United States National Aeronautics and Space Administration, Washington, D.C." should be deleted in it entirety.

Signed and Sealed this

Tenth Day of July, 1990

*Attest:*

HARRY F. MANBECK, JR.

*Attesting Officer*

*Commissioner of Patents and Trademarks*